United States Patent [19]

Flanigan

[11] 4,131,499
[45] Dec. 26, 1978

[54] LOW SMOKE PROPELLANT
[75] Inventor: David A. Flanigan, Huntsville, Ala.
[73] Assignee: Thiokol Corporation, Newtown, Pa.
[21] Appl. No.: 804,683
[22] Filed: Jun. 8, 1977

Related U.S. Application Data

[63] Continuation-in-part of Ser. No. 720,532, Sep. 7, 1976.
[51] Int. Cl.$^2$ ............................................. C06B 45/10
[52] U.S. Cl. ..................................... 149/19.3; 149/92
[58] Field of Search ................................. 149/92, 19.3

[56] References Cited

U.S. PATENT DOCUMENTS

| | | | |
|---|---|---|---|
| 3,326,731 | 6/1967 | Noddin | 149/92 X |
| 3,647,891 | 3/1972 | Loudas et al. | 149/19.3 X |
| 3,728,170 | 4/1973 | Stott et al. | 149/92 X |
| 3,872,192 | 3/1975 | Kaufman et al. | 149/92 X |

*Primary Examiner*—Stephen J. Lechert, Jr.
*Attorney, Agent, or Firm*—Stanley A. Marcus; Royal E. Bright

[57] ABSTRACT

Solid propellant compositions comprising a binder component based on hydroxy or carboxy containing perfluorocarbon polymers and nitramines, and which optionally contain as plasticizers fluorinated hydrocarbons, or perfluorinated esters, ethers, alkenes, or alkanes, having high specific impulse and low smoke exhaust are disclosed.

7 Claims, No Drawings

LOW SMOKE PROPELLANT

CROSS REFERENCE TO COPENDING APPLICATION

This application is a Continuation-in-Part of application Ser. No. 720,532, filed Sept. 7, 1976.

REFERENCE TO ART CITED IN THE PARENT APPLICATION

Reference is hereby made to U.S. Pat. Nos. 3,629,020 and 3,767,488 cited during the prosecution of application Ser. No. 720,532. Copies of these patents accompany this application. The references deal with various fluorocarbons in pyrotechnic or propellant materials but are not concerned with low smoke propellants. The invention of this application is therefore distinguishable from these references for the reasons advanced during the prosecution of similar claims in application Ser. No. 720,532.

BACKGROUND OF THE INVENTION

Propulsion with low or zero smoke has become of increasing importance in a number of tactical weapons systems. Excessive quantities of smoke produced by a propellant can interfere not only with weapons guidance, but in air launch operations, with pilot visibility in general. Smoke can also assist detection by the enemy in field operations.

The presence of water vapor in propellant exhaust is a major contributor to highly visible smoke.

The present invention relates to propellants wherein the exhaust consists principally of HF, CO, $CO_2$, $N_2$ traces of hydrogen and only, at most, a minor proportion of water vapor.

SUMMARY OF THE INVENTION

The invention provides in a composition aspect a low smoke solid propellant composition, substantially free of metallic fuel which comprises:

(a) a nitramine, and
(b) a solid binder component based on a hydroxy or carboxy substituted perfluorocarbon polymer.

The tangible embodiments of this composition aspect of the invention possess the inherent applied use characteristic of being usable as propellants in rockets, and having low or zero smoke exhaust, and high specific impulse.

A preferred aspect of this composition aspect of the invention is a propellant as defined herein above wherein the weight ratio of the fluorocarbon to the nitramine is from about 10:90 to about 60:40. Particularly preferred are those compositions wherein the weight ratio of fluorocarbon to nitramine is about 33 to 67 to about 31 to 69.

The invention further provides an improved solid propellant rocket having a fluorocarbon binder based propellant wherein the improvement comprises the use of a nitramine as the oxidizer in said propellant.

This aspect of the invention has the inherent applied use characteristics of being a rocket having high specific impulse and low or zero smoke exhaust useable in field or air launch operations especially where the absence of smoke confers a tactical advantage.

The invention still further provides in a preferred aspect of the composition aspect of the invention a low smoke solid propellant composition comprising a nitramine and a solid binder component which additionally contains a fluorinated hydrocarbon, or a perfluorinated ester, ether, alkene or alkane or a mixture thereof as a plasticizer.

DESCRIPTION OF THE PREFERRED EMBODIMENT

The method of preparing and using the compositions of the invention will now be illustrated with reference to a specific embodiment thereof; namely a solid propellant comprising a hydroxy terminated perfluorocarbon polymer binder such as hydroxy terminated polytetrafluoroethylene and the nitramine cyclotetramethylene tetranitramine (HMX).

The fluorocarbon and the HMX are mixed with a diisocyanate curing agent, conveniently isophorone diisocyanate, and, if desired, a plasticizer such as a perfluorinated polyether, for example, perfluoropolyethylene glycol, vacuum degassed, cast or otherwise conventionally formed into the desired shape and cured at elevated temperatures.

It will be obvious to one skilled in the art that in addition to the particular nitramine (HMX) illustrated other solid and liquid nitramines known in the art will be suitable. Typical of these are such compounds as cyclo trimethylene trinitramine (RDX) and various nitramines such as nitro guanidine, nitroamino guanidine, and trinitromelamine. Similarly in place of the hydroxy terminated polytetrafluoroethylene illustrated it will be obvious to substitute other hydroxy or carboxy terminated perfluoropolymers such as hydroxy terminated polyperfluorobutadiene, hydroxy terminated polyperfluorostyrene, and hydroxy terminated polyperfluoromethyl acrylate. That the hydroxy or carboxy functions need not necessarily be in terminal positions will also be self evident, and any saturated or unsaturated fluorocarbon polymer bearing these substituents in positions on the molecule where they are available for crosslinking or even mixtures thereof are intended by the term hydroxy or carboxy substituted perfluorocarbon polymer both in the specification and in the appended claims. Similarly it will also be obvious that for the perfluoro polyethylene glycol plasticizer illustrated other liquid perfluoro ethers, esters, alkenes, and alkanes may be substituted. Exemplary of these are: di-1H, 1H pentadecafluorooctyl-1-perfluoroadipate, di-1H, 1H-pentadecafluoro-octyl-1-perfluorophthalate, and perfluorinated alkanes or alkenes. The term fluorocarbon when used herein and in the appended claims comprehends both the perfluorocarbon polymer binder and any fluorinated plasticizer which may be incorporated into a particular composition.

One skilled in the art will also recognize that in addition to the isophorone diisocyanate illustrated any of the known polyisocyanate urethane curing agents may be employed to cure hydroxy or carboxy terminated prepolymers. Illustrative of these are such compounds as, 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutoxy-2,4-diisocyanate, 1,4-diethoxyphenyl-2,5-diisocyanate, toluene-2,4-diisocyanate, toluene-2,6-diisocyanate, diphenylether-2,4-diisocyanate, naphthalene-1,4-diisocyanate, 1,1'-dinaphthalene-2,2'-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, hexamethylene diisocyanate, dipropyl diisocyanate, ether, heptanethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethylbenzene diisocyanate, 1,2-dimethylcyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane,-2,2-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate,4,4'-methylenebis(-cyclohexylisocyanate), ethylidene diisocyanate, 4,4'-diphenyl diisocyanate, dianisidine diisocyanate, 1,5-naphthalene diisocyanate, m-phenylene diisocyanate, isopropylidene bis(phenyl or cyclohexyl isocyanate), 1,3-cyclopentylene diisocyanate, 1,2-cyclohexylene diisocyanate, 1,4-cyclohexylene diisocyanate, 4,4',4'''-triphenylmethane triisocyanate, 1,3,5-triisocyanatobenzene, phenylethylene diisocyanate, and the like.

One skilled in the art would also recognize that carboxy terminated perfluoroprepolymers may also be cured with polyfunctional epoxides or aziridines.

One skilled in the art would also recognize that if one desires a greater specific impulse than is available from the fluorocarbon nitramine combination per se, metallic fuels may be added, although it must be recognized that the exhaust would then contain visible oxides of the metal employed. One would also recognize that in order to minimize the formation of water vapor in the exhaust the proportion of fluorine to oxygen in the final composition should be as high as practicable, the hydrogen content should be as low as possible, and that particular ingredients selected for inclusion in a composition should be selected with this desirable result in consideration.

The following Examples further illustrate the best mode contemplated by the inventor for the practice of his invention.

EXAMPLE 1

A liquid hydroxyl terminated polytetrafluoroethylene prepolymer (14 parts by weight), cyclotetramethylene tetranitramine (HMX) (86 parts by weight) and isophorone diisocyanate (1.1 equivalent to the hydroxy tetrafluoroethylene) are blended, degassed and cured at 170° F. When tested this propellant exhibited a specific impulse of about 252 seconds with a water content in the exhaust of 7.6 weight percent. The exhaust had low visibility.

EXAMPLE 2

A liquid hydroxy terminated polytetrafluoroethylene (26 parts by weight), HMX (74 parts by weight) and isophorone diisocyanate (1.1 equivalent to hydroxy polytetrafluoroethylene) are blended, degassed and cured at 170° F. When tested the propellant has a specific impulse of about 239.5 seconds and the water content is 2.4%. The exhaust has less visibility than that of Example 1.

EXAMPLE 3

Pressed strands were prepared from 80% HMX and 20% polytetrafluoroethylene powder of 3 strands prepared, 2 cracked on ignition, but the 3rd in a windowed combustion chamber at 1000 psi ignited uniformly and the burn rate was 0.65 in./sec. only a slight haze was observed to result from the combustion process.

EXAMPLE 4

A carboxyl terminated fluorinated acrylate acrylic acid polymer (3M Co. FX-162) cured with MAPO

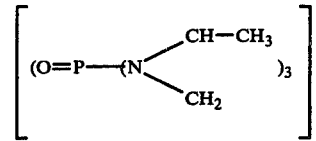

and containing a perfluorinated liquid (3M Co. L-2092) plasticizer at a 3/1 plasticizer/binder ratio is formulated with 65% HMX. Satisfactory cure is obtained although some plasticizer bleeding does occur following cure. The high density of this particular binder system does not permit processing with higher HMX concentrations. The burn rate is 0.32 in./sec. at 1000 psi with a pressure exponent of 0.81.

I claim:

1. A low smoke propellant composition which comprises:
 (a) a nitramine,
 (b) a solid binder component based on a hydroxy or carboxy substituted perfluorocarbon powder, and which is substantially free of metallic fuel.

2. A solid propellant composition as defined in claim 1 wherein the binder additionally contains a liquid perfluorinated ester, ether, alkane, or alkene as a plasticizer.

3. A solid propellant composition as defined in claim 1 wherein the fluorocarbon to nitramine ratio is from 10:90 to 60:40 on a weight basis.

4. A solid propellant composition as defined in claim 2 wherein the fluorocarbon to nitramine ratio is from 10:90 to 60:40 on a weight basis.

5. A solid propellant composition as defined in claim 3 wherein the fluorocarbon to nitramine ratio is from 33:67 to 31:69 on a weight basis.

6. A solid propellant composition as defined in claim 1 wherein the ratio of fluorinated binder to nitramine is from 33:67 to 31:69 on a weight basis.

7. A solid propellant composition as defined in claim 1 wherein the fluorinated binder is based upon hydroxy terminated polytetrafluoroethylene.

* * * * *

UNITED STATES PATENT OFFICE
CERTIFICATE OF CORRECTION

Patent No. 4131499            Dated December 26, 1978

Inventor(s) David A. Flanigan

It is certified that error appears in the above-identified patent and that said Letters Patent are hereby corrected as shown below:

Column 4, Claim 1, line 44, delete the word "powder", and insert therefor the word -- polymer --.

Signed and Sealed this

Eleventh Day of December 1979

[SEAL]

Attest:

SIDNEY A. DIAMOND

Attesting Officer      Commissioner of Patents and Trademarks